No. 693,005. Patented Feb. 11, 1902.
E. J. GILMORE.
SALT CELLAR OR DREDGE.
(Application filed Nov. 1, 1901.)
(No Model.)
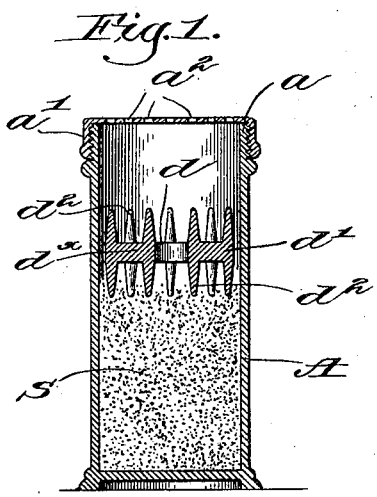
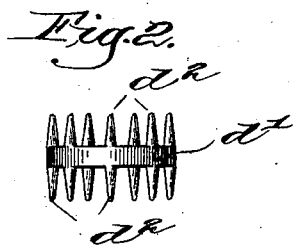
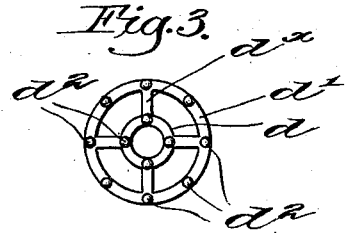
Witnesses.
Thomas J. Drummond
W. C. Lunsford
Inventor.
Elbert J. Gilmore,
by Crosby Gregory
Attys.
THE NORRIS PETERS CO., PHOTO-LITHO., WASHINGTON, D. C.

UNITED STATES PATENT OFFICE.

ELBERT J. GILMORE, OF LOWELL, MASSACHUSETTS.

SALT CELLAR OR DREDGE.

SPECIFICATION forming part of Letters Patent No. 693,005, dated February 11, 1902.

Application filed November 1, 1901. Serial No. 80,810. (No model.)

*To all whom it may concern:*

Be it known that I, ELBERT J. GILMORE, a citizen of the United States, and a resident of Lowell, county of Middlesex, State of Massachusetts, have invented an Improvement in Salt Cellars or Dredges, of which the following description, in connection with the accompanying drawings, is a specification, like letters on the drawings representing like parts.

This invention has for its object the production of a simple, cheap, and effective salt cellar or dredge such as is used for table service, whereby clogging of the perforated top is prevented and the salt in the receptacle is broken up into small particles or granules, the top of the body of salt being always acted upon by the breaking or agitating means. No matter how damp the atmosphere my invention will not only prevent clogging of the top, but it will always insure the presence of loose granular salt at the top of the main body thereof in the cellar.

Figure 1 is a vertical diametral section of a salt-cellar embodying one form of my invention, the agitator being shown in normal position, supported upon the body of salt at its top. Fig. 2 is a side elevation of the agitator shown in section in Fig. 1, and Fig. 3 is a top or bottom view of the agitator.

The salt cellar, box, or receptacle A for containing the salt S, Fig. 1, has a threaded top, as at $a$, to receive a correspondingly-threaded top $a'$, provided with discharge-perforations $a^2$, and I prefer to make the receptacle A cylindrical in cross-section.

The agitator (shown separately in Figs. 2 and 3) is preferably made of metal, non-corrodable by the action of the salt or dampness, and it comprises a disk-like central body having apertures therein and provided with series of oppositely-extended prongs. The body is herein shown as a spider, composed of concentric rings $d$ $d'$, connected by radial arms $d^\times$, and having prongs $d^2$ extended from opposite sides thereof, the openings between the rings and arms permitting the passage therethrough of small quantities of salt. The exterior diameter of the agitator is slightly less than the internal diameter of the receptacle A, so that the agitator may freely move longitudinally therein, the length of the prongs preventing it from tipping or turning over, and in any event the cross-section of the disk-like portion of the agitator will be similar to that of the receptacle.

In the device herein shown the body of salt always supports on its top the agitator, the downwardly-projecting prongs serving to loosen or break up the salt at the top, while the upturned prongs act when the device is used to clear the holes $a^2$ in the top $a'$ to prevent clogging. When the salt-cellar is in use, it is turned nearly upside down, and the agitator will be thrown against the top and some of the salt will pass through the openings in the agitator to the top $a'$ and out through its perforations, and when the cellar is set aside the agitator drops back with the body of salt and again rests on the top thereof. Every time the article is used the agitator is brought into operation both to clear the top and to break up some salt, and the latter will be rendered usable until the last particle is used. The area of the agitator is sufficient to provide a sufficient supporting-surface, which rests on the top of the salt body, so that no matter how small such body the agitator cannot work down into it and be embedded therein. Owing to the length of the prongs and the limited clearance between the agitator and the receptacle, the said agitator cannot tip or turn upon its side, and consequently the prongs of one series are always directed toward the top $a'$ and the others toward the body of salt.

My invention is not restricted to the precise construction and arrangement herein shown and described, as the same may be varied or modified without departing from the spirit and scope thereof.

Having fully described my invention, what I claim as new, and desire to secure by Letters Patent, is—

1. A salt-cellar consisting of a receptacle for the salt, a perforated top fitted thereon, and an agitator longitudinally movable in the receptacle and provided with a series of oppositely-extended prongs, to clear the perforations in the top and to break the salt, on the top of which the agitator normally rests, said agitator having openings therein to admit the passage of the salt, and having a continuous periphery which closely approaches the inner wall of the receptacle.

2. A salt-cellar consisting of a receptacle for the salt, a perforated top therefor, and an agitator comprising a body having apertures therein and corresponding exteriorly to the cross-section of the receptacle and provided with oppositely-extended series of prongs, to clear the perforations in the top and to break the salt on the top of which the agitator is normally supported, the periphery of the body closely approaching the inner wall of the receptacle.

3. As a new article of manufacture, an agitator for salt-cellars, comprising an apertured, disk-like member having series of elongated prongs extended oppositely therefrom.

In testimony whereof I have signed my name to this specification in the presence of two subscribing witnesses.

ELBERT J. GILMORE.

Witnesses:
   JOHN C. EDWARDS,
   CHARLES E. OSBORNE.